March 16, 1965 V. S. PETERSON 3,173,299
AIR BEARING POSITION INDICATING SYSTEM
Filed Oct. 26, 1961 2 Sheets-Sheet 1

INVENTOR
VICTOR S. PETERSON
BY Donald J. Bradley
AGENT

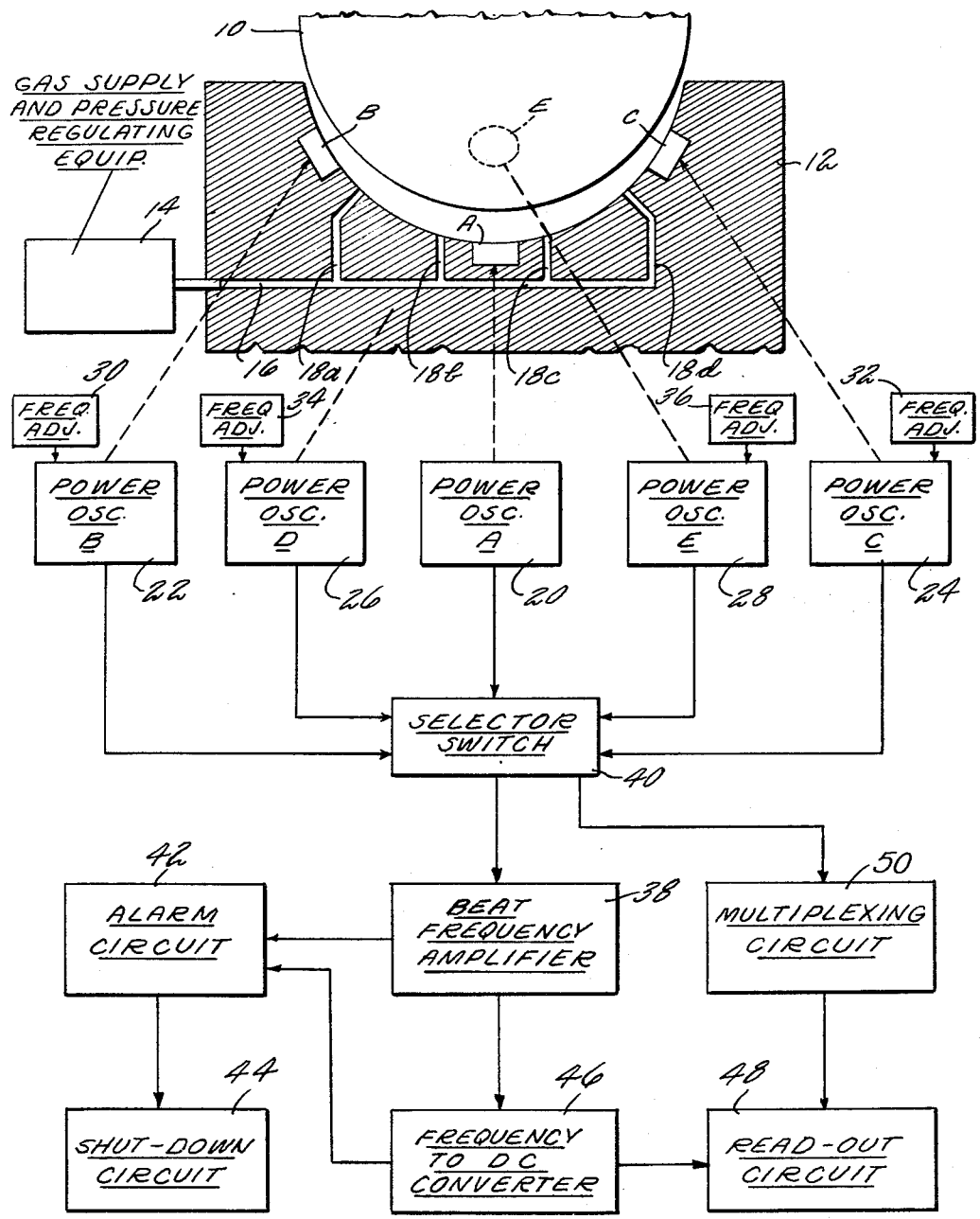

United States Patent Office 3,173,299
Patented Mar. 16, 1965

3,173,299
AIR BEARING POSITION INDICATING SYSTEM
Victor S. Peterson, Springfield, Mass., assignor to United Aircraft Corporation, East Hartford, Conn., a corporation of Delaware
Filed Oct. 26, 1961, Ser. No. 147,920
4 Claims. (Cl. 73—516)

This invention relates to apparatus for determining the position of a ball within its seat in an air bearing assembly.

Air bearing assemblies are commonly used where extremely low friction is desired between moving mechanical parts. Air or gas under very high pressure is forced through the seat, and by regulating the clearance between the ball and the seat, a pressure build-up occurs which will act on the ball in a manner to form a cushion on which the ball will rest. The ball itself will generally be connected with a mechanism which it is desired to move or rotate in some manner, while the seat is generally fixed. The air cushion will allow the ball to move in the seat with practically no frictional forces acting on the ball. An example of apparatus utilizing an air bearing assembly may be had by referring to copending U.S. application Serial No. 135,348, filed August 31, 1961, entitled "Guidance System Test Apparatus."

For precision applications, the ball and seat will be finished to provide very smooth surfaces. Any contact between the ball and seat during movement of the ball may result in a galling type of damage to the structure. Contact may result from a number of situations including a malfunction of the air supply or an appreciable unbalance of the load carried by or attached to the ball. This invention discloses a novel system for determining the position of the ball within the seat and for generating an alarm signal whenever the ball and seat geometry approaches a condition wherein the ball may strike the seat. With such information available, action may be initiated to prevent contact or to minimize the chance of damage. The position information may also be useful for determining the position or orientation of the mechanism attached to the ball.

In practicing the invention, a plurality of coil assemblies are contained at or near the surface of the seat. Each coil forms the main tank circuit of an electronic oscillator. If the oscillators are tuned to the same frequency of oscillation when the ball is resting on the seat, frequency changes which occur in the oscillator as the ball is lifted from its seat when the air is turned on will indicate the separation between the ball and the seat.

It is therefore an object of this invention to provide a novel system and apparatus for determining the position of a ball within its seat in an air bearing assembly.

Another object of this invention is a novel system for producing a control signal in an air bearing assembly when the ball approaches the seat.

A further object of this invention is a novel system for preventing or reducing the damage which occurs when the ball strikes the seat in an air bearing assembly.

Another object of this invention is a novel electronic system for producing information of the position of the ball within its seat in an air bearing assembly.

These and other objects and an understanding of the invention may be gained by referring to the following drawings, read in conjunction with the description and claims, in which:

FIG. 2 is a schematic diagram of the ball and seat, showing the associated electronics in block diagram form.

Referring now to FIG. 2, the ball 10 is positioned within seat 12. A supply of gas, which may be clean dry air, and associated equipment for pressurizing and regulating the gas is shown by block 14. The pressurized gas may be fed through line 16 and branch lines 18a, 18b, 18c, and 18d for supplying the gas to appropriate orifices or nozzles (not shown) and providing the necessary pressure to lift ball 10 slightly off the seat 12 and thereby produce the desired air cushion. The gas supply equipment and lines here shown are merely for purposes of illustration, since it is obvious that the amount of gas, the pressure, and the number and position of nozzles will vary with the particular application.

The ball 10 will be resting firmly within seat 12 when the gas supply is turned off. The inside of seat 12 will precisely conform to the shape of ball 10.

Figure 1:
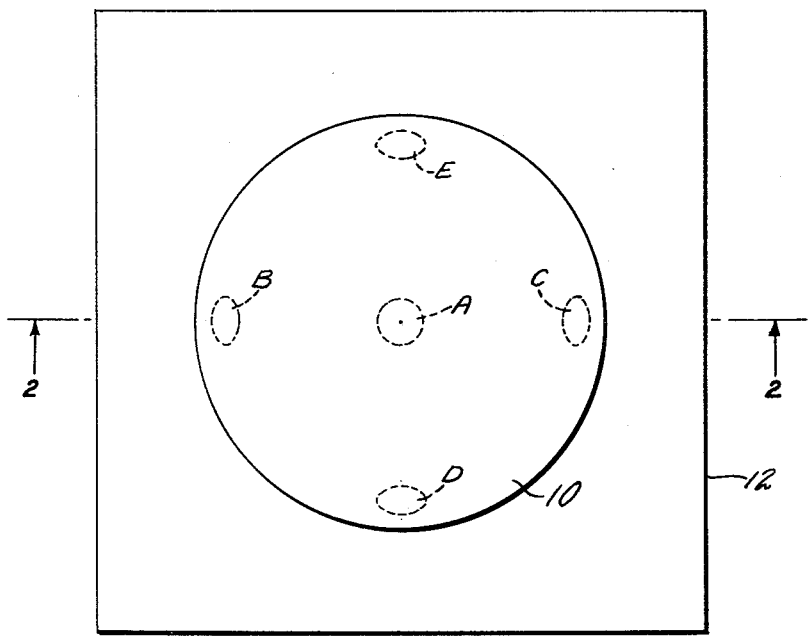
FIG. 1 is a top view of the seat assembly and associated coils.

The positioning system employs a coil assembly as the basic position sensory transducer. The coils will be described as being mounted within a pot core, but, as will be apparent, other configurations may be used. FIG. 1 shows the position of five coils, A, B, C, D, and E, mounted within seat 12, and FIG. 2, which contains a view of seat 12 taken along line 2—2 of FIG. 1, shows that the coils are contained at or slightly below the surface of seat 12. Coil A is located near the bottom of the seat, while coils B, C, D, and E are spaced 90° apart near the upper portion of the seat. All the pot cores can be potted with any non-metallic material and ground or lapped to conform with the accuracy of the curvature of the seat.

Figure 3:
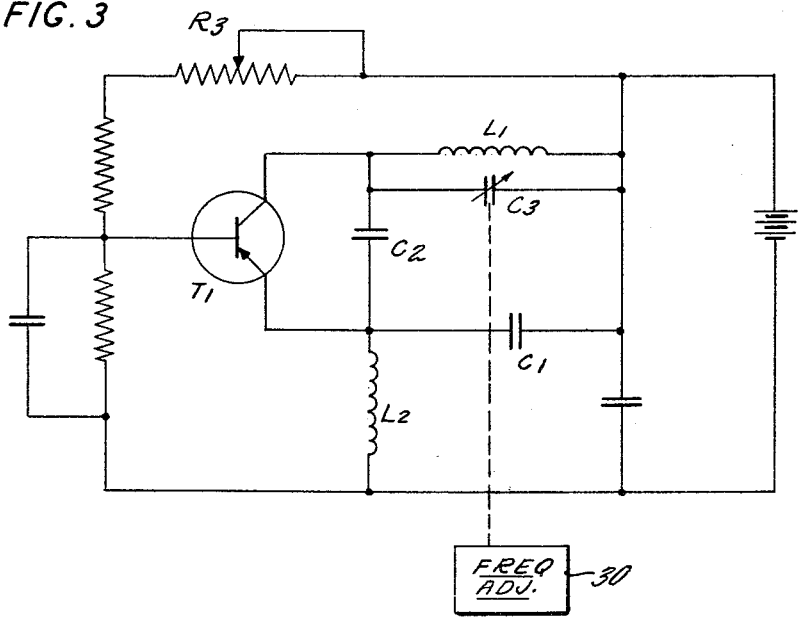
FIG. 3 is a schematic diagram of a typical transistorized power oscillator which may be used as shown in FIG. 2.

Each coil is connected with a power oscillator and the coil forms a portion of the main tank circuit of the oscillator. In FIG. 2, the power oscillators 20, 22, 24, 26, and 28 are shown connected with their associated coils. A typical power oscillator circuit which may be used containing a single power transistor $T_1$ is shown in FIG. 3. The frequency of oscillation of each power oscillator is determined primarily by $L_1$, $C_1$, and $C_2$. $L_1$ is the coil contained in the core, and associated with seat 12. To obtain the best power output at the low voltages used in transistor operation and at the same time have a reasonable loaded Q in the tuned circuit means that $L_1$ should have a low inductance and $C_1$ and $C_2$ must be correspondingly large. The unloaded Q of $L_1$ should be high for the efficiency of the tuned circuit to be high. The bias is adjusted by $R_3$. $L_2$ is a choke coil.

Since the power oscillator components are temperature sensitive, the oscillators themselves may be mounted on a common heat sink. With this arrangement, ambient temperature changes will affect the operating parameters of all five power oscillator circuits equally.

The four power oscillator circuits 22, 24, 26, and 28 associated with the four 90° spaced coils B, C, D, and E can be tuned over a limited frequency range, as shown by blocks 30, 32, 34, and 36. Where ball 10 is fabricated from stainless steel, an oscillator tank circuit frequency of the order of 20 kc. will afford sufficient sensitivity. Power oscillator 20, associated with coil A, need not be tunable. The four power oscillator circuits, 22, 24, 26, and 28 are tuned to the frequency of power oscillator 20 when the ball 10 is resting firmly on seat 12 with the gas supply shut off from the air bearing. The frequency adjustment may be accomplished by tuning each power oscillator 22, 24, 26, and 28 to zero beat with oscillator 20 in a beat frequency amplifier 38. FIG. 3 shows that the frequency adjustment is made by varying the capacitance of $C_3$ to thereby vary the frequency response of the tank circuit. A selector switch 40 is connected between the power oscillator circuits and the beat frequency amplifier 38, switch 40 being a mechanical, electromechanical or electronic switch which is adjustable to connect each oscillator output independently and two or more outputs concurrently to the beat frequency amplifier 38. For example, the switch 40 may have the following outputs; oscillator A, oscillator B, oscillator C, oscillator D, oscillator E, oscillators A–B, A–C, A–D, A–E, B–C–D–E, and A–B–C–D–E. To adjust the frequency of power oscillators 22, 24, 26, and 28 to correspond with the frequency of oscillator 20, the switch 40 may be started at setting A–B, and the outputs from oscillators 20 and 22 will then be directed through switch 40 to beat frequency amplifier 38, where any beat frequency caused by frequency variations between oscillators 20 and 22 will be sensed, and oscillator 22 may be adjusted to provide a zero beat when the frequency variation is reduced to zero. The same adjustment may be made to the other oscillators, 24, 26, and 28, by moving switch 40 and selecting outputs A–C, A–D, and A–E in order. As a check, output A–B–C–D–E may then be selected. If a beat frequency is present, the frequency adjustment must be performed again, since no beat frequency will be present when all oscillators are tuned to the same frequency.

Once all oscillators are tuned to the same frequency, the gas supply to the bearing assembly is turned on. Ball 10 should then lift from seat 12. As ball 10 lifts it will be found that the frequency of oscillation of all the oscillators will change toward a higher or lower frequency, depending on the materials used. This is caused by the fact that when ball 10 is adjacent to the coil which forms part of the oscillator circuit, the magnetic coupling between the coil and the ball will produce a fixed value of inductance in the circuit, and result in a fixed frequency of oscillation, but as ball 10 moved away from the coil, the coupling is changed, thus varying the inductance in the circuit and varying the frequency of oscillation. The inductance of $L_1$ increases in the presence of a ball made of a magnetic material, and the inductance decreases in the presence of a nonmagnetic material ball. It is this frequency change caused by the inductance change which may be sensed to thereby indicate the position of ball 10 relative to seat 12.

If no malfunction or unbalance exists in the gas supply system or the load connected with ball 10, the frequency change in oscillators B, C, D, and E should be equal when the gas supply is actuated and the ball 10 lifted slightly from its seat, since the ball should be symmetrically positioned within the seat 12. If, therefore, selector switch 40 is set to give output B–C–D–E, the beat frequency resulting from the four outputs should be zero when the ball is raised from the seat. If a beat frequency is present, an unbalance exists, and the greater the unbalance, the higher the beat frequency will be. If an alarm circuit 42 is connected with beat frequency amplifier 38, and the alarm circuit is designed to be activated only when the beat frequency is above a preselected value, it is clear that a slight unbalance in ball 10 will not trigger the alarm circuit, but that any unbalance which exceeds a maximum will trigger the alarm circuit. The alarm may be any visual or audible signal. In addition, a shut down circuit as illustrated by block 44 may be connected with the alarm circuit 42 and actuated at the same time as the alarm circuit or instead of the alarm circuit to turn off the gas supply or discontinue operation of the apparatus connected with the ball 10 when an alarm condition exists. Thus, at any time during operation, if the ball approaches any portion of the seat or if the ball becomes unbalanced relative to the seat, an alarm will be actuated or shut down action taken to prevent or warn of impending damage to the ball and seat.

It is also obvious that as ball 10 is raised from the seat 12, the frequency of oscillation of oscillator 20 associated with coil A will change as a function of the height of the ball 10 above seat 12. An additional alarm circuit and/or shut down circuit may be provided to sense the output of oscillator 20 and institute proper action if the height of the ball above the seat is less than a preselected minimum. Depending on the application, the ball should rise a certain minimum amount when the gas supply is turned on. If the ball does not rise, an alarm may be sounded or shut down initiated to prevent damage. Also, during operation, if the ball approaches too closely to the bottom of the seat, action may be desired. It is clear that the output of oscillator 20 need not be directed through switch 40, but may be connected directly to an alarm circuit which will respond directly to the height indication. Other arrangements may readily be conceived, including the use of multiplexing circuits to direct different outputs from selector switch 40 to the proper channels for appropriate action.

The output of the beat frequency amplifier 38 may be directed to a frequency to D.C. conversion circuit, shown as block 46. Such circuits will translate the beat frequency into a D.C. signal which is some function of the input frequency. Frequency to D.C. circuits are known in the art and need not be described in detail here. The D.C. output may be used to actuate the alarm and shut down circuits instead of having the circuits responsive to frequency, as shown by the dotted line connection between the converter 46 and alarm circuit 42. A read-out circuit shown at block 48, which may be a tape recorder, a panel meter or other output device may be connected to the D.C. output circuit 46. by using multiplexing devices such as shown at 50, particular output signals or all output signals may be recorded or indicated by the read-out circuit 48 to provide continuous monitoring of ball position. For example, the multiplexer, which may be any electronic or mechanical device, would feed each output in order to the read-out circuit 48 for recording purposes to thereby produce a complete record of ball position.

A particularly desirable use for the output signals is for actuating the gas supply equipment to provide additional gas pressure to push the ball 10 away from the seat if the ball approaches too closely to the seat. For example, if ball 10 approached coil B, this fact may easily be sensed by the novel apparatus and read-out circuits, and a signal sent to the gas supply and regulating equipment 14 to cause an increase in the gas flow from line 18a and its associated nozzle to apply additional force and attempt to prevent the ball from striking the seat. Other similar arrangements will be obvious to those skilled in the art.

It is obvious that the output circuits and associated alarm and read-out devices described herein are merely representative, and the numerous modifications may be made without departing from the scope of the invention. In addition, other types of transducers may be used in place of the coil arrangement, including optical, sonic, and capacitive. However, the embodiment disclosed is the preferred one for accurately determining the position of the ball, utilizing well-known state-of-the-art equipment.

I claim:

1. Apparatus for determining the position of a ball relative to a seat in an air bearing assembly comprising a ball, a seat partially surrounding said ball and adapted to support said ball, means to supply a fluid under pressure to the junction between said ball and said seat whereby said ball rotates within said seat upon said fluid, and means including a coil for generating a frequency signal, said coil being mounted within said seat adjacent said ball and producing an electromagnetic field which inductively couples said ball, said signal generating means being responsive to changes in said inductive coupling for varying the frequency of said signal as a function of changes in distance between said ball and said seat.

2. Apparatus as in claim 1 comprising a plurality of said signal generating means, each of said signal generating means including a coil, in which one of said coils is positioned substantially at the bottom of said seat, and the remainder of said coils are positioned within said seat circumferentially about said bottom coil.

3. Apparatus as in claim 2 in which each of said plurality of signal generating means is an oscillator.

4. Apparatus as in claim 3 and including means to adjust the frequency of oscillation of each oscillator to thereby produce identical signal frequencies when said ball is resting upon said seat.

References Cited by the Examiner
UNITED STATES PATENTS

| | | | |
|---|---|---|---|
| 2,316,915 | 4/43 | Truman | 324—61 |
| 2,390,328 | 12/45 | Roberts | 340—199 X |
| 2,558,683 | 6/51 | Hart | 340—195 |
| 2,562,575 | 7/51 | Raesler | 324—61 |
| 2,578,713 | 12/51 | Martellotti | 308—122 |
| 2,730,696 | 1/56 | Davis | 340—195 |
| 2,825,978 | 3/58 | Davis | 324—61 X |
| 2,911,538 | 11/59 | Munz | 324—83 X |
| 2,914,730 | 11/59 | Nadler | 324—79 X |
| 2,939,072 | 5/60 | Bell | 340—195 |
| 3,003,356 | 10/61 | Nordsieck | 73—504 |
| 3,080,761 | 3/63 | Speen | 73—516 |

FRANK SUSKO, *Primary Examiner.*

ROBERT C. RIORDON, *Examiner.*